United States Patent [19]

Barsotti et al.

[11] Patent Number: 5,582,922
[45] Date of Patent: Dec. 10, 1996

[54] SINGLE PACKAGE EPOXY COATING

[75] Inventors: Robert J. Barsotti, Franklinville, N.J.; Jeffery W. Johnson, Rochester Hills, Mich.

[73] Assignee: E. I. Du Pont de Nemours and Company, Wilmington, Del.

[21] Appl. No.: 437,197

[22] Filed: May 8, 1995

Related U.S. Application Data

[63] Continuation of Ser. No. 175,986, Dec. 29, 1993, abandoned.

[51] Int. Cl.[6] .................................................. C08L 37/00
[52] U.S. Cl. .................. 428/500; 525/176; 525/327.3; 525/386
[58] Field of Search ....................... 525/176, 327.3, 525/386; 428/480, 500

[56] References Cited

U.S. PATENT DOCUMENTS

| | | | |
|---|---|---|---|
| 4,681,811 | 7/1987 | Simpson | 428/413 |
| 4,732,790 | 3/1988 | Blackburn | 427/407.1 |
| 4,732,791 | 3/1988 | Blackburn | 427/407.1 |
| 5,428,082 | 6/1995 | Gould | 523/400 |

FOREIGN PATENT DOCUMENTS

| | | |
|---|---|---|
| 2091265 | 5/1993 | Canada. |
| 9411415 | 5/1994 | WIPO. |

*Primary Examiner*—Patricia A. Short
*Attorney, Agent, or Firm*—James A. Costello

[57] ABSTRACT

A coating composition based on a low molecular weight anhydride resin having pendant non-cyclic anhydride moieties, an epoxy resin containing glycidyl methacrylate and latent cataylst exhibits excellent stability in a completely formulated state and excellent performance characteristics as a coating.

12 Claims, No Drawings

SINGLE PACKAGE EPOXY COATING

This is a continuation of application Ser. No. 08/175,986, filed Dec. 29, 1993, now abandoned.

BACKGROUND OF THE INVENTION

The present invention relates to a curable coating composition particularly useful as a top coat in multi-layered coating systems.

Base coat-clear coat systems have found wide acceptance in the past decade as automotive finishes. Continuing effort has been directed to such coating systems to improve the overall appearance, the clarity of the top coat, and the resistance to deterioration. Further effort has been directed to the development of coating compositions having low volatile organic content (VOC).

Previous efforts at improving the etch resistance and durability of coatings had suggested the use of anhydride resins having pendant non-cyclic anhydride moieties in combination with resins that react with the polyanhydride resins to cure under curing conditions. However, a continuing need exists for coating formulations which provide both stability before application to a substrate and outstanding performance characteristics after application, and particularly resistance to environmental etching.

SUMMARY OF THE INVENTION

The present invention provides a sprayable coating composition which, through the selection of the chemical makeup and molecular weight of the components, provides a fully formulated coating composition which exhibits stability over extended periods of time combined with ease of application, outstanding appearance and durability after application and ease of maintenance.

Specifically, the instant invention provides a curable coating composition comprising organic solvent and binder comprising (a) an anhydride resin having a molecular weight of less than about 2,000 that contains (1) a central moiety, and (2) on average, more than one pendant, non-cyclic anhydride moiety bonded to each central moiety;

(b) a coreactant polymeric resin having a molecular weight of about from 1,000 to 20,000 and comprising at least about 30 wt % of copolymerized ethylenically unsaturated monomer containing epoxy group;

(c) a functional amount of at least one latent catalyst, the curable composition being stable at ambient conditions for a period of at least about two weeks; wherein the coating composition has a volatile organic content of less than about 3.8 pounds of organic solvent per gallon of curable coating composition and wherein the ratio of equivalents of epoxy to anhydride is about from 0.7 to 1.4.

DETAILED DESCRIPTION OF THE INVENTION

The coating compositions of the present invention comprise an anhydride resin, a co-reactant epoxy resin, and a latent catalyst, each as described below.

Anhydride resins which can be used in the present invention include those having a molecular weight of less than about 2000 having a central moiety and more than one pendant, non-cyclic anhydride moiety bonded to each central moiety. The anhydride is asymmetrical, and preferably contains a moiety represented by the following formula:

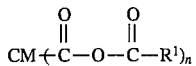

wherein (CM) is a central moiety, $(R^1)$ is an organic moiety, and n is a number of pendant anhydride groups that averages greater than one.

The central moiety can be a simple organic moiety, such as an aliphatic, cycloaliphatic or aromatic moiety, with a plurality of anhydride groups bonded to it. Alternatively, it can contain a plurality of repeating units which are bonded to one or more pendant anhydride groups. Examples of suitable non-polymeric central moieties are those derived from multifunctional alcohols such as pentaerythritol, trimethylolpropane and neopentyl glycol. The multifunctional alcohols are reacted with cyclic, monomeric anhydride such as methyl hexahydrophthalic anhydride to give a multifunctional acid containing moiety. The resulting product is then reacted with ketene to form the linear pendant anhydride.

The central moiety is linked to more than one non-cyclic anhydride moiety, on average. It is preferably linked to at least about 2 non-cyclic anhydride groups on average and more preferably to at least about 3 non-cyclic anhydride groups on average. The anhydride equivalent weight (formula weight per anhydride group) is preferably at least about 200 and preferably no more than about 1000.

Each anhydride moiety is typically terminated by an organic group $(R^1)$. This group is preferably aliphatic and more preferably alkyl. It preferably contains no more than about 6 carbon atoms, more preferably no more than about 4 carbon atoms, and most preferably methyl.

The oligomeric anhydride can optionally contain a polyvalent organic moiety (A) that is linked to a plurality of anhydride groups by a plurality of pendant linking groups (LG), as illustrated in the following formula:

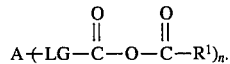

The linking group (LG) can contain, for example, ester linkages, alkylene groups, ether linkages, urethane linkages and combinations of those. The polyvalent organic group can contain, for example, a polyvalent alkyl or aromatic group. The combination of the polyvalent organic moiety (A) and the linking groups (LG) forms the central moiety (CM) as previously described.

The central moiety can optionally contain other functional groups in addition to the pendant non-cyclic anhydride groups. For example, the central moiety may contain pendant acid groups, so that the anhydride is represented by the formula:

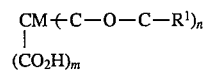

wherein m is the number of pendant acid groups and all other characters have the meaning previously given. The molar ratio of pendant non-cyclic anhydride groups to pendant acid groups in the oligomeric anhydride is preferably at least about 25:75, more preferably at least about 50:50, and more highly preferably at least about 75:25. Most preferably, the anhydride contains substantially no pendant acid groups. The central moiety can also contain minor quantities of cyclic anhydride moieties.

The molecular weight of the anhydride resin is an important feature of the present invention, and should be less than about 2000. At molecular weights of the oligomeric anhydride greater than 2000, it is difficult to attain a sprayable composition with a volatile organic content of less than about 3.8 pounds of organic solvent per gallon of curable compositions. The molecular weight of the anhydride resin is preferably about from 400 to 1,000, and the anhydride resin preferably has 3 to 4 pendant, non-cyclic anhydride moieties bonded to each central moiety.

A second component of the present formulation is a polymeric epoxy resin. An important feature of the epoxy resins used in the present invention is that the resin comprise at least about 30 wt % copolymerized ethylenically unsaturated monomer containing an epoxy group and have a molecular weight of about from 1,000 to 20,000. The epoxy resin can further comprise copolymerized monomers of alkyl methacrylates, or alkyl acrylates or mixtures thereof, where the alkyl groups have 1–12 carton atoms. Optionally, the acrylic polymer can contain other components such as styrene, alphamethyl styrene, acrylonitrile, methaerylonitrile in amounts of about 0.1–50% by weight.

Typical alkyl acrylates and methacrylates that can be used to form the anhydride acrylic polymer are as follows: methyl methacrylate, ethyl methacrylate, propyl methacrylate, butyl methacrylate, pentyl methacrylate, hexyl methacrylate, octyl methacrylate decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the acrylic polymer are acrylamide, methacrylamide, acrylo alkoxy silanes such as gamma methacrloyl propyl trimethoxy silane.

The relative concentrations of the anhydride resin and the epoxy resin can vary widely. However, the ratio of equivalents of epoxy to anhydride should be about from 0.7 to 1.4.

The compositions of the present invention further comprise at least one latent catalyst. In the context of the present invention, latent catalyst is understood to mean a catalyst which has little or no effect on the ingredients with which it is blended at ambient or storage conditions, but which promotes the reaction of these components at elevated temperatures or when applied to a substrate. While a wide variety of such catalysts can be used, as will be evident to those skilled in the art, those found to be particularly satisfactory in the present invention include onium compounds such as those selected from the group consisting of quaternary phosphonium compounds, quaternary ammonium compounds and tertiary amines blocked with acids such as sulfonic acid and phosphoric acid. Catalysts which have been found particularly satisfactory include quaternary phosphonium salts such as tetrabutylphosphonium chloride or quaternary ammonium salts such as tetrabutylammonium halide, especially chloride. It has been found that the use of unblocked tertiary amine compounds of the type previously used in coating formulations will depreciate the long term stability of the present formulations. A functional amount of latent catalyst is used in the present formulations, and will vary widely, depending on the specific anhydride resin and epoxy resin selected, as well as their molecular weight and relative proportions. While the specific concentration of the latent catalyst will be selected in view of these variables, as evident to those skilled in the art, the quantities will generally be about from 0.1 to 5 wt %, based on the weight of the solids in the formulation.

The coating compositions of the present invention are formulated into high solids coating systems with at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate.

In the preparation and storage of the compositions of the present invention, to provide for long term stability, compounds containing active hydrogen should be minimized, such as alcohols or water.

The coating compositions of the present invention can also contain conventional additives such as pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating.

The compositions of the present invention have a volatile organic content of less than about 3.8 pounds of organic solvent per gallon of curable composition, that is, at least about 50 wt % solids. In addition, the present coating compositions are stable at ambient conditions for a period of at least about two weeks. This permits the preparation of a complete coating composition under ideal formulation conditions, shipment and use of the coating composition within the two week period without further modification or blending that would be required if the components needed to be maintained apart prior to application to a substrate. The coating compositions are typically applied to a substrate by conventional techniques such as spraying, electrostatic spraying, roller coating, dipping or brushing. The present formulations are particularly useful as a clear coating for outdoor articles, such as automobile and other vehicle body parts. The substrate is generally prepared with a primer and or a color coat or other surface preparation prior to coating with the present compositions. The present coating compositions can be applied using conventional techniques such as wet-on-wet applications over solvent borne basecoats, or over dried water borne basecoats. The ability to apply the present compositions by spraying techniques with the unusually low VOC content is particularly suprising for a one package epoxy coating formulation.

After application to a substrate, the present compositions are cured by heating to a temperature of about from 120° to 140° C. for a period of about from 15 to 90 minutes.

The performance characteristics of the final cured coating composition are excellent, providing a combination of excellent gloss and durability to abrasion, sunlight and acidic rain. At the same time, the compositions provide ease of handling, resulting from all the components being present in a single formulation, good shelf life and low volatile organic content.

The present invention is further illustrated by the following specific examples, in which parts and percentages are by weight unless otherwise indicated.

EXAMPLE 1

A curable coating composition was prepared from an anhydride resin, co-reactant polymeric epoxy resin and latent catalyst.

(a) Anhydride Resin

The anhydride resin was prepared from a tetra-functional half-acid ester. The following constituents were charged to a reaction vessel equipped with a heating mantle, reflux condenser, thermometer, nitrogen inlet, and stirrer:

|  | Parts by Weight |
|---|---|
| Portion 1 | |
| Pentaerythritol | 478.0 |
| Methyl hexahydrophthalic anhydride | 2250.0 |
| Triethylamine | 0.5 |
| Portion 2 | |
| Xylol (135–145C.) | 2250.0 |
| Total | 4978.5 |

Portion 1 was charged into the reaction vessel, heated to 180° C. under a nitrogen blanket and held for 30 minutes. After the hold period, the reaction mixture was cooled and Portion 2 added.

The solution prepared above was used to make a linear pendant anhydride. The solution was charged into a 5L flask equipped with a stirrer and a gas inlet tube. The gas inlet tube was attached to a ketene generator similar to the one described by Williams et al. in the Journal of Organic Chemistry 5,122, 1940. Ketene is bubbled through the solution until all of the acid groups have been converted to anhydride groups. Reaction progress was monitored via FTIR. Solvent was then removed under vacuum to give a linear pendant anhydride with the following characteristics:

% weight solids: 78.0

Anhydride eq. wt: 329+/−4 (on solution basis)

Acid eq. wt: 6176+/−1323 (on solution basis)

(b) Epoxy Polymer

An epoxy functional polymer was prepared by charging the following constituents into a polymerization vessel equipped with a heating mantle, reflux condenser, thermometer, nitrogen inlet, and stirrer;

|  | Parts by Weight |
|---|---|
| Portion 1 | |
| Xylol (135–145C.) | 1370.7 |
| Portion 2 | |
| Glycidyl methacrylate | 868.0 |
| Butyl methacrylate | 1193.5 |
| Butyl acrylate | 108.5 |
| Aromatic 100 | 150.0 |
| Portion 3 | |
| t-butyl peroxyacetate | 120.2 |
| Aromatic 100 | 199.8 |

Portion 1 was charged into the polymerization vessel and heated to reflux under nitrogen. Portion 2 was then added to the vessel over 360 minutes and Portion 3 over 390 minutes. After the addition of Portion 3 was completed the reaction mixture was held at reflux for 30 minutes and then 790.5g of solvent removed distillation. The resulting polymer solution had the following characteristics:

% weight solids: 70.0

Mw of polymer: 4283

Mn of polymer: 1925

| Coating Composition | |
|---|---|
| Components | Parts by Weight |
| Linear Pendant Anhydride | 54.18 |
| Epoxy Polymer | 75.86 |
| Dislon 1984 acrylic flow additive (10% in xylene) from King Industries | 2.50 |
| Tinuvin 384 (UV screener from Ciba-Geigy) | 1.90 |
| Tinuvin 123 (HALS from Ciba-Geigy) | 1.40 |
| Cataylst solution | 2.00 |
| TOTAL | 137.83 |

The catalyst solution was a 20% by weight solution of tetrabutylphosphonium chloride in PM acetate.

The coating composition was sprayed onto primed metal panels coated with a basecoat and cured at 285° F.

EXAMPLE 2

A coating composition was prepared as in Example 1. except the epoxy resin was prepared by charging the following constituents into a polymerization vessel equipped with a heating mantle, reflux condenser, thermometer, nitrogen inlet, and stirrer:

|  | Parts by Weight |
|---|---|
| Portion 1 | |
| Xylol (135–145C.) | 2074.7 |
| Portion 2 | |
| Glycidyl methacrylate | 1800.9 |
| Butyl methacrylate | 36.2 |
| Butyl acrylate | 1206.5 |
| Styrene | 760.9 |
| Portion 3 | |
| t-butylperoxyacetate | 254.8 |
| Xylol (135–145) | 366.1 |
| TOTAL | 6500.1 |

Portion 1 was charged into the polymerization vessel and heated to reflux under nitrogen. Portion 2 was then added to the vessel over 180 minutes and Portion 3 over 210 minutes. After addition of Portion 3, the reaction mixture was held at reflux for an additional 30 minutes and then 900g of solvent removed by distillation. The resulting polymer solution had the following characteristics:

% weight solids: 70.0

Mn of polymer=2695

Mw of polymer=5292

A clearcoat coating composition was prepared by thoroughly blending the following components.

| Components | Parts by Weight |
|---|---|
| Linear Pendant Anhydride | 65.00 |
| Epoxy Polymer | 67.54 |
| Dislon 1984 (10% in Xylene) | 2.50 |
| Tinuvin 384 | 1.90 |
| Tinuvin 292 | 1.40 |
| Catalyst solution (as above) | 2.00 |
| TOTAL | 140.34 |

The coating composition was sprayed onto primed metal panels coated with a basecoat and cured at 285° F.

EXAMPLE 3

A coating composition was prepared as in Example 1, except the epoxy resin was prepared by charging the following constituents into a polymerization vessel equipped with a heating mantle, reflux condenser, thermometer, nitrogen inlet, and stirrer:

|  | Parts by Weight |
|---|---|
| Portion 1 | |
| Xylol (135–145C.) | 177.5 |
| Aromatic Hydrocarbon (155–177C.) | 1193.2 |
| Portion 2 | |
| Glycidyl methacrylate | 868.0 |
| Butyl methacrylate | 651.0 |
| Butyl acrylate | 325.5 |
| Styrene | 325.5 |
| Aromatic Hydrocarbon (155–177C.) | 85.0 |
| Portion 3 | |
| t-butylperoxyacetate (75% in Mineral Spirits) | 90.2 |
| Aromatic Hydrocarbon (155–177C.) | 319.8 |
| TOTAL | 4035.7 |

Portion 1 was charged into the polymerization vessel and heated to reflux under nitrogen. Portion 2 was then added to the vessel over 180 minutes and Portion 3 over 210 minutes. After addition of Portion 3, the reaction mixture was held at reflux for an additional 30 minutes and then 845.5 of solvent removed by distillation. The resulting polymer solution had the following characteristics:

% weight solids: 70.0

Mn of polymer=849

Mw of polymer=2040

A clearcoat coating composition was prepared by thoroughly blending the following components.

| Components | Parts by Weight |
|---|---|
| Linear Pendant Anhydride | 32.04 |
| Epoxy Polymer | 49.50 |
| 50% Dislon 1984 in Xylene | 0.29 |
| Tinuvin 384 | 1.19 |
| Tinuvin 123 | 0.9 |
| Catalyst solution (as above) | 1.64 |
| Butyl Acetate | 14.44 |
| TOTAL | 100 |

The coating composition was sprayed onto primed metal panels coated with a basecoat and cured at 285° F.

In each of the Examples, the cured coating exhibited outstanding appearance and durability.

We claim:

1. A curable coating composition comprising organic solvent and binder comprising (a) an anhydride resin having a weight average molecular weight of about 400 to 2,000 that contains a central moiety, and 3 to 4 pendant, noncyclic anhydride moieties bonded to each central moiety;

(b) a coreactant acrylic polymeric resin having a weight average molecular weight of about 2,000 to 20,000 and comprising at least about 30 weight percent of copolymerized ethylenically unsaturated epoxy group-containing monomer; and (c) a functional mount of at least one latent catalyst; wherein the curable composition is stable at ambient conditions for a period of at least about two weeks, the coating composition has a volatile organic content of less than about 3.8 pounds of organic solvent per gallon of curable coating composition, and the ratio of equivalents of epoxy to anhydride is about 0.7 to 1.4.

2. A composition of claim 1 wherein the latent catalyst consists essentially of at least one onium compound.

3. A composition of claim 2 wherein the latent catalyst is selected from at least one compound of the group consisting of quaternary phosphonium compounds, quaternary ammonium compounds and acid-blocked tertiary amines.

4. A composition of claim 3 wherein the onium compound comprises tetrabutylphosphonium halide.

5. A composition of claim 1 wherein anhydride resin consists essentially of the reaction product of pentaerythritol, a methyl hexahydrophthalic anhydride and ketene.

6. A composition of claim wherein the coreactant resin has a molecular weight of about 3,000 to 8,000.

7. A composition of claim 6 wherein the coreactant resin comprises at least about 40 weight percent of glycidyl methacrylate.

8. A curable coating composition of claim 1 further comprising from 1 to 200 parts by weight, per 100 parts of components (a) and (b), of pigment.

9. A curable coating composition of claim 1 applied to a substrate.

10. A coated substrate of claim 9 wherein the substrate is coated with a pigmented base coat.

11. A coated substrate of claim 10 wherein the applied curable composition is substantially free from pigment.

12. A coated substrate of claim 10 wherein the base coat is a water-based coating composition.

* * * * *